United States Patent [19]

Barkalow

[11] 4,430,893

[45] Feb. 14, 1984

[54] PNEUMATIC LUNG ANALOG FOR SIMULATION OF SPONTANEOUS BREATHING AND FOR TESTING OF VENTILATORY DEVICES USED WITH SPONTANEOUSLY BREATHING PATIENTS

[75] Inventor: Clare E. Barkalow, Comstock Park, Mich.

[73] Assignee: Michigan Instruments, Inc., Grand Rapids, Mich.

[21] Appl. No.: 321,434

[22] Filed: Nov. 16, 1981

[51] Int. Cl.³ .............................................. G01F 3/22
[52] U.S. Cl. ..................................... 73/168; 128/728; 434/267
[58] Field of Search .................. 73/168; 434/267, 272; 128/728, 727

[56] References Cited

U.S. PATENT DOCUMENTS

| Re. 29,317 | 7/1977 | Mosley et al. | 35/17 |
| 2,228,983 | 1/1941 | Bloomheart | 128/2.08 |
| 2,999,495 | 9/1961 | Shipley | 128/2.08 |
| 3,363,260 | 1/1968 | Garbe | 346/72 |
| 3,420,225 | 1/1969 | Holden et al. | 128/728 |
| 4,323,078 | 4/1982 | Heimlich | 128/728 |

FOREIGN PATENT DOCUMENTS

890125 1/1944 France .
1293633 10/1972 United Kingdom .

Primary Examiner—Gerald Goldberg
Assistant Examiner—Brian R. Tumm
Attorney, Agent, or Firm—Price, Heneveld, Huizenga & Cooper

[57] ABSTRACT

A pneumatic lung analog for simulating spontaneous breathing and for testing of ventilatory devices used with spontaneously breathing patients and a kit for modifying training test lungs for this purpose is provided. The lung analog comprises a frame, a test ventilator, or lung simulator, expansible chamber; and a spontaneous breath expansible chamber disposed on the frame for receiving the output of a ventilatory device and a spontaneous breath generator, respectively. A movable end plate is disposed on the lung simulator and spontaneous breath expansible chambers for concurrent movement therewith when the spontaneous breath expansible chamber is inflated. Transducers are provided for measuring the airway pressure and the volume of air supplied to the lung simulator chamber by the ventilator being tested for determining the performance characteristics of the ventilator, such as the added work of breathing attributable to the ventilator.

44 Claims, 7 Drawing Figures

PNEUMATIC LUNG ANALOG FOR SIMULATION OF SPONTANEOUS BREATHING AND FOR TESTING OF VENTILATORY DEVICES USED WITH SPONTANEOUSLY BREATHING PATIENTS

BACKGROUND OF THE INVENTION

This invention relates generally to pneumatic lung analogs and more particularly, is directed to a pneumatic lung analog capable of testing ventilatory devices intended for use with spontaneously breathing patients.

In general, ventilatory devices may be divided into two categories: devices intended to support apneic (non-spontaneously breathing) patients, commonly termed control ventilation; and devices intended to be used in conjunction with spontaneously breathing patients. Frequently, a single device may provide modes of operation covering both categories of use. This invention deals specifically with the testing of ventilatory devices which are intended to be used (or have such operational modes) with spontaneously breathing patients. Examples of such equipment include, demand oxygen inhalation devices, "assist" ventilators, and intermittent mandatory ventilation (IMV) devices.

In the case of a demand oxygen inhalation device, the patient provides a small continuous negative pressure signal to the device produced by his inhalation, and this signal automatically provides a flow of oxygen to the patient until he begins to exhale, at which time the pressure signal reverses from negative to positive. During inhalation, the patient must maintain a slight negative pressure within the device, and this requirement, in effect, imposes an additional breathing work load on the patient which is of concern. However, the disadvantage, if small, can be significantly outweighed by the attendant advantages of enriched oxygen breathing, and the "on demand" feature conserves the supply of oxygen.

"Assist" ventilators are designed to be triggered by the patient's initial spontaneous breathing effort. After sensing an initial negative airway pressure or flow produced by the patient, then such a device applies positive pressure to the patient for the inspiration of breathing gas. During such inspiration, no effort is required by the patient. Termination of each inspiration is automatic, and may depend on time, delivered volume, or pressure. In testing this type of device, the demand made on the patient to trigger it to an "on" state is of concern, and involves a knowledge of peak negative pressure needed, flow, response time, and added work of breathing.

Intermittent Mandatory Ventilators (IMV) are so termed because they intermittently and automatically apply pressurized gas to the patient at preset intervals. However, between such intermittent machine breaths, the patient is expected to breath through the device spontaneously. During these periods, the breathing gas is preferably conditioned as needed by the patient (for example, oxygen and humidity may be added, and the temperature controlled); also, instead of allowing the patient to exhale fully down to atmospheric pressure, a low pressure plateau of up to 30 cm. $H_2O$ pressure above atmospheric, is frequently maintained. This is called constant positive airway pressure (CPAP) and is very useful under certain conditions in treating patients with pulmonary disease. However, in all cases for the patient on IMV, between mandatory breaths the patient must, on his own effort, draw breathing gas from the ventilator. Any internal resistance in the ventilator causes the patient's work of breathing to increase over open breathing where the patient is not connected to the ventilator. Some IMV ventilators incorporate servo mechanisms to reduce this work of breathing, but in all cases the patient must generate a small subatmospheric (or sub-CPAP) pressure in order to cause gas flow, and this always causes some additional work of breathing. This added work of breathing is of concern in the testing of IMV ventilators.

Pneumatic lung analogs for testing ventilators are known in the prior art. Such machines must be capable, through adjustment, of simulating a wide range of patient pulmonary physiology, ranging from pediatric to large, adult patients with various types and states of pulmonary disease. One such device is the training test lung disclosed in U.S. Pat. No. Re. 29,317 reissued July 26, 1977 to Mosley et al, the disclosure of which is hereby incorporated by reference.

The training test lung disclosed by Mosley et al simulates human lungs by providing a pair of expansible chambers or bellows which are secured at one end to a frame and at the other end to a pair of movable end plates. The bellows are interconnected by a Y-shaped fitting to assistant ventilation equipment for inflation. The movable end plates pivot relative to the frame as the bellows are inflated and the free end of the pivotable plate cooperates with printed indicia on a panel adjacent thereto, to provide a visual readout of the inspired tidal volume. Pulmonary compliance is simulated by adjustable springs which interconnect the pivotable plates and the stationary frame. Respiratory flow resistance is simulated by calibrated flow resistant tubes disposed in the flow path extending between the expansible bellows and the assistant ventilator.

Since control ventilators apply positive pressure to inflate the patient's lungs, when a patient is being treated by a control ventilator, the actual work of breathing is being carried out by the ventilator. This sometimes creates a problem, since with the extended periods of assisted ventilation, the patient begins to lose the ability to generate the work of breathing himself. Such patients often become quite dependent upon the ventilator and it may become difficult to wean these patients away from the ventilator. This problem led to the development of ventilators capable of carrying out intermittent mandatory ventilation. The newer IMV ventilators solve this problem by allowing a patient that is not apneic to breathe simultaneously whenever possible. Such a patient may be breathing weakly, erratically, or undependably, but there are advantages to allowing such a patient to generate the work of breathing himself whenever possible. Typically, such a ventilator provides a pathway for the patient to breathe through on his own,. However, such ventilators also periodically apply a positive airway pressure to create a mandatory breath. This type of ventilator can protect a patient who is capable of becoming apneic, and can be used to wean a patient away from assisted ventilation. When an IMV ventilator is used with a patient that is capable of accomplishing the work of breathing himself, the added work of breathing created by the ventilator, is of course, critical to the successs of the treatment. Thus, there is a need for a test device that simulates the spontaneous breathing patient and measures the added work of breathing created by an IMV ventilator. To the applicant's knowledge, there are no economically feasible and successful devices in the prior art for testing an IMV ventilator, or any other type of ventilator intended for use on spontaneously breathing patients, in this fashion.

SUMMARY OF THE INVENTION

These and other problems in the prior art are solved by provision of a new pneumatic lung analog and a kit for modifying the older training test lung, to create a lung analog capable of testing ventilators intended for use with spontaneously breathing patients. The lung analog comprises a frame, a lung simulator, or test ventilator, expansible chamber disposed on the frame for receiving the output of a ventilator under test, such chamber simulating human lungs; a spontaneous breath generator expansible chamber disposed on the frame for receiving the output of a spontaneous breath generator; and a movable plate disposed on the lung simulator and spontaneous breath chambers for movement therewith, such that inflation of one of the chambers produces a corresponding expansion of the other chamber. This portion of the pneumatic lung analog may, for example, comprise an older training test lung of the type used to test control ventilators. Since the training test lung is provided with two movable end plates connected to first and second expansible bellows for independent movement therewith, a coupler extending between the end plates is required. The spontaneous breath generator may, for example, comprise a standard volume ventilator which is connected to one of the expansible bellows of the training test lung. The volume ventilator drives the spontaneous breath expansible chamber wuth air at pressures required to simulate a typical human spontaneous breath in the test ventilator chamber, which expands therewith due to the coupler. The expanding test ventilator chamber thus simulates a spontaneously breathing patient and draws in inspired gas by creation of a sub-ambient pressure (negative pressure) within it. The ventilator which is connected to the test ventilator chamber senses the negative pressure generated by the expanding test ventilator chamber and supplies ventilatory gas to the chamber, as it would to a breathing patient. The ventilatory cycle of the spontaneous breath generator can be varied to simulate the varying demands which a patient may place on a ventilator, or it may be preset to a typical, average patient condition. The added work of breathing imposed by breathing through the ventilator during those portions of the ventilatory cycle when a spontaneously breathing patient is simulated, is measured by a transducer which monitors sub-ambient pressure created within the airway or the patient connection of the test ventilator, along with means for determining the instantaneous volume of gas inhaled by the test ventilator chamber. The added work of breathing is then represented by the mathematical integral of pressure relative to volume over a complete breathing cycle.

DESCRIPTION OF THE PREFERRED EMBODIMENTS

Figure 1:
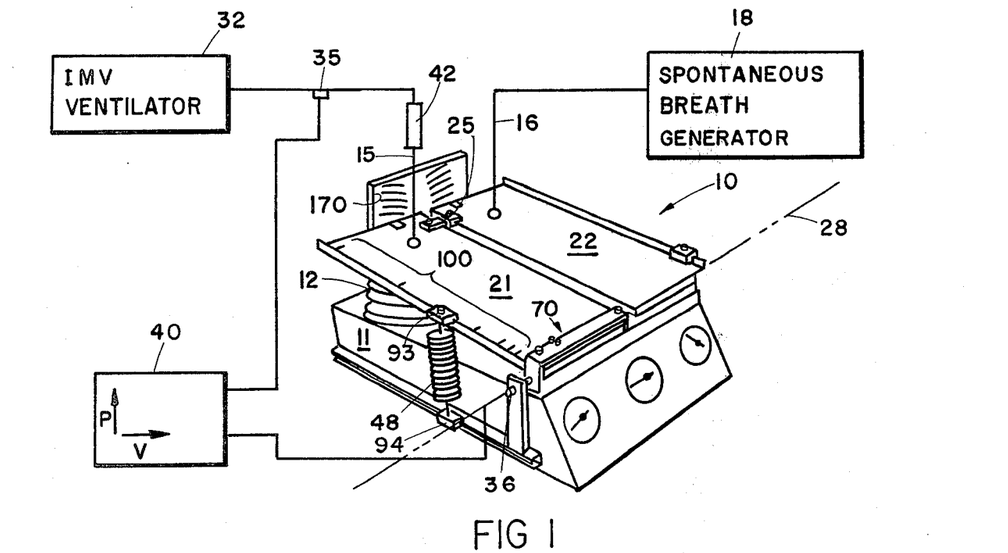
FIG. 1 is a persepctive view of the lung analog of the present invention.
Figure 2:
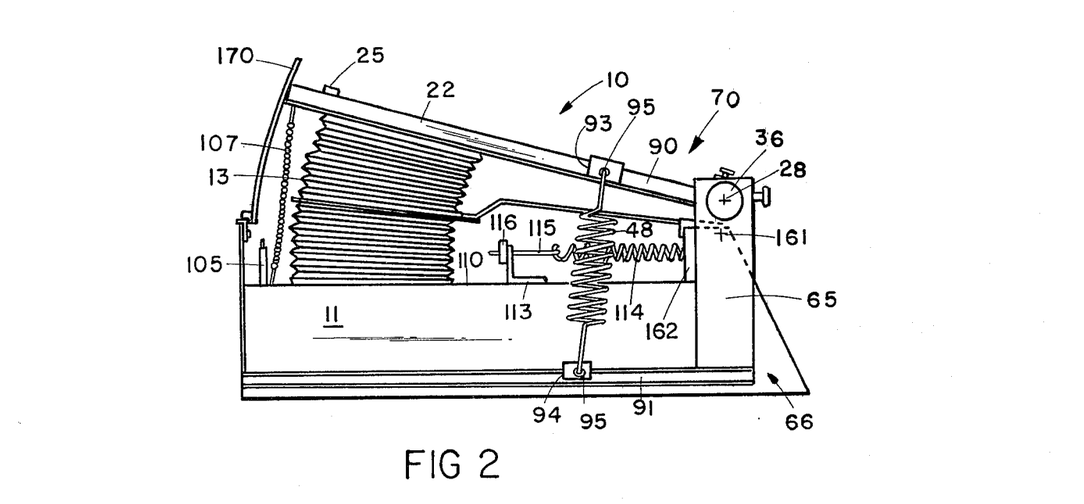
FIG. 2 is a side elevational view of the lung analog of the present invention.
Figure 3:
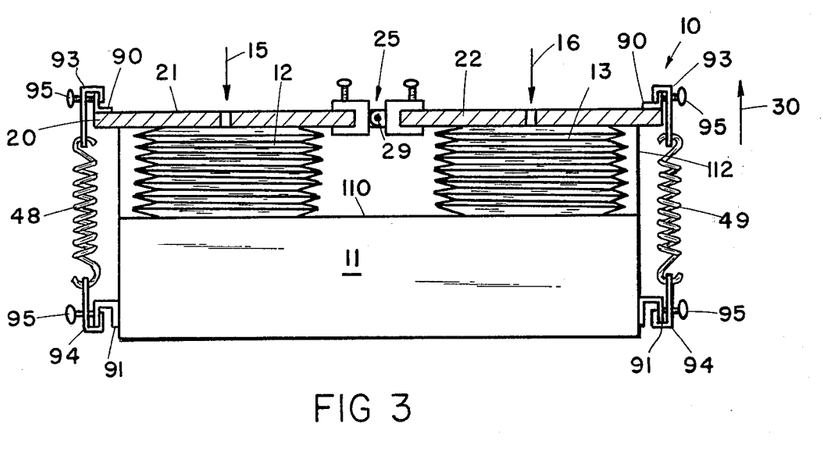
FIG. 3 is a rear elevational view partially in section of the lung analog of the present invention.

With reference to FIGS. 1, 2 and 3, the pneumatic lung analog of the present invention is illustrated at 10. The device comprises a frame 11 having a test ventilator, or lung simulator, expansible chamber 12 and a spontaneous breath generator expansible chamber 13 disposed thereon. The test ventilator chamber 12 receives the output of a test ventilator on line 15 and the spontaneous breath chamber 13 receives the output of a spontaneous breath generator on line 16. The spontaneous breath generator illustrated in block form at 18 in FIG. 1 may, for example, comprise a volume ventilator of the type well known in the art. The resistance into and the compliance of test ventilator chamber 12 is set to simulate the flow resistance and compliance of a pair of human lungs. A movable end plate 20 is disposed on the ventilator test chamber 12 and the spontaneous breath chamber 13 for concurrent movement therewith when one of the chambers are inflated. The plate 20 may comprise one continuous generally planar member, however, in preferred embodiments it has been found preferable to modify an older training test lung which has two movable plates. Thus, as best illustrated in FIG. 1, in preferred embodiments, the movable end plate comprises a movable test ventilator end plate 21 and a movable spontaneous breath end plate 22. The test ventilator chamber 12 and the spontaneous breath chamber 13 are disposed between the frame 11 and the movable ventilator test plate 21 and the movable spontaneous breath plate 22, respectively. A coupler, or means for interconnecting, is disposed at 25 between the two end plates to ensure the concurrent motion of the two plates. In preferred embodiments, the couple 25 comprises a hinged connection and the movable plates 21 and 22 are pivotable about a common axes 28. The pivot axis 29 of the coupler 25 extending between the movable plates 21 and 22 is orthogonal to the common axis 28 of the movable plates. When the spontaneous breath generator 18 applies pressure to the spontaneous breath chamber 13, the chamber 13 expands, driving the movable plates 21 and 22 upward in the direction of the arrow 30 in FIG. 3. The spontaneous breath generator applies air to the chamber 13 at pressures and volumes needed to simulate a typical spontaneous breath, in chamber 12, of a human patient. Since the plates 21 and 22 are interconnected, the test ventilator chamber 12 expands therewith, placing a demand on the test ventilator at 32 simulating a spontaneously breathing patient. The added work of breathing imposed by the test ventilator is determined by calculating:

$$W = \int P dv \qquad (1)$$

Where P equals sub-ambient airway pressure created by the patient's spontaneous breath, and V equals the instantaneous volume of air supplied to the test ventilator chamber 12, simulating the patient's lungs.

Means are provided for providing a measure of the pressure and volume of air applied to the test ventilator chamber comprising a pressure transducer disposed at 35 and a variable electrical resistance disposed at 36 for measuring the angular displacement of the test ventilator end plate 21. The outputs of these transducers are preferably inputted to analyzing means at 40. The analyzing means 40 may comprise a programmable digital processor, a microprocessor, or an X-Y recorder. In the case of an X-Y recorder, the area of the curve plotted by the X-Y recorder at 40 is representative of the added work of breathing through the test ventilator.

In the case where a dedicated computer is used at 40, the computer is responsive to data inputs such as pressure and volume, to evaluate for example, the function W as set out in Equation (1) over a single breath cycle, and to present W as a computed value automatically. This could be done on an analog or digital basis, and the computer also could be utilized to provide and read out other test data, such as peak negative pressure, response time, etc.

A flow resistor 42 is normally disposed between the transducer 35 and the test chamber 12 to simulate the flow resistance of the respiratory tract of a patient. The flow resistance may, for example, be a tube or the like of a known cross-sectional area which creates a predetermined flow resistance. The natural resilience of the human lung is simulated by tension springs 48 and 49 which interconnect the movable end plates and the stationary frame 11. Normally, tension spring 48 would be set to the compliance value desired to simulate the human patient, and tension spring 49 would be set over common axis 28.

There are many conceivable modifications to the pneumatic lung analog of the present invention. The end plate 20 may, for example, be one continuous planar plate. The end plate 20 need not be pivotable about one end as long as an equivalent mechanical arrangement is provided for insuring translational, parallel displacement. A single plate may be provided which engages just one of the expansible chambers. An arm disposed on the single plate may then engage the other expansible chamber. Pivoting of the end plate 20 about a generally horizontal axis such as the common axis 28 is regarded as one of the most expedient means for achieving this goal, even though some torsional distortion of the plates may occur, requiring a hinged coupler, and compensating corrections to the tidal volume scales. While in the embodiment illustrated herein, a variable electrical resistance 36 is used for measuring the angular displacement of the movable end plate 20, other approaches for determining the volume of air introduced to the test ventilator chamber 12 are conceivable. For example, the change in pressure encountered on opposite sides of the flow resistor 42, could be used as a measure of the flow of air supplied to the test ventilator chamber 12. This flow measurement could then be integrated relative to time to define instantaneous volume.

In the embodiment of the invention presently preferred, the pneumatic lung analog of the present invention is a modification of the training test lung previously disclosed and claimed in U.S. Pat. No. Re. 29,317 reissued July 26, 1977, the disclosure of which is incorporated by reference. The training test lung is an item that has been commercially available for some time and thus, in its most basic form, the present invention may comprise a kit for modifying the training test lung. Such a kit would comprise means for connecting one of the chambers of the training test lung to a spontaneous breath generator and connecting the other chamber to a test ventilator. A conventional volume ventilator which is normally on hand may be used to drive the spontaneous breath chamber, or a special spontaneous breath generator may be supplied as part of the kit. The kit also includes a hinged coupler to provide for the concurrent motion of the two end plates and may also include means for providing a measure of the pressure and volume of air applied to the test ventilator expansible chamber such that the added work of breathing imposed by the test ventilator can be determined.

The training test lung comprises a pair of expansible chambers arranged in mutual association with a pair of movable end plates to simulate a pair of lungs. However, each of the bellows and end plates are individually provided with sufficient capacity and controlled restraint to simulate the compliance of a normal adult pair of lungs. In the normal operation of the training test lung, the movable end plates operate independently and are separately adjustable in terms of the flow resistance and resiliency simulated.

Figure 4:
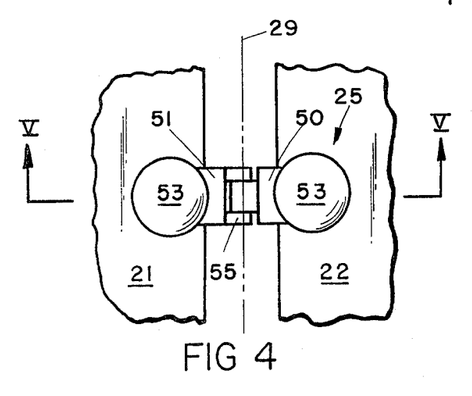
FIG. 4 is a top view of a hinged coupler used to interconnect the movable plates of the lung analog of the present invention.
Figure 5:
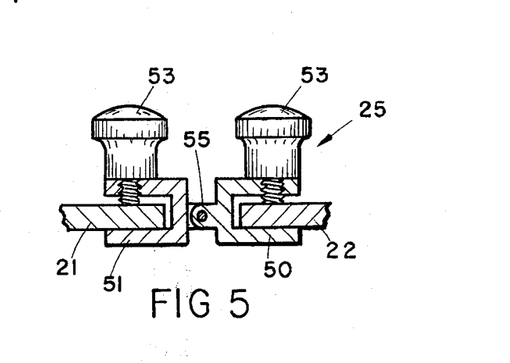
FIG. 5 is a partial sectional view of the hinged coupler illustrated in FIG. 4 taken along line V—V of FIG. 4.

With specific reference now to FIGS. 4 and 5, it is illustrated that to form the lung analog of the present iinvention, a hinged coupler 25 is provided comprising first and second generally U-shaped clamps 50 and 51 which engage the spontaneous breath and test ventilator end plates 22 and 21, respectively. Each of the clamps 50 and 51 are provided with thumb actuated set scrrews 53. A hinge 55 defining a pivot axis 29 extends between the clamps 50 and 51. The coupler 25 is mounted between the movable plates of the training test lung and oriented such that the pivot axis of the hinge 55 is orthogonal to the common axis 28 of the movable end plates. As best illustrated in FIG. 1, preferably the connection is made near the free end of the movable end plates 21 and 22 to minimize flexing of the free ends of the end plates. While a pivotable connection is preferred, other types of connections may prove satisfactory. Such connections might involve the use of a simple lift bar which is secured to the spontaneous breath plate and which extends under the test ventilator end plate for lifting the same when a spontaneous breath is applied to the spontaneous breath expansible chamber.

The pressure transducer 35 may comprise any one of a number of commercially available in-line pressure transducers having an output compatible with X-Y recorder 40. With specific reference to FIGS. 6 and 7, the preferred embodiment of the transducer which provides a measure of the volume of air applied to the test ventilator expansible chamber, is illustrated. The volume transducer preferably comprises a variable resistance 36 which monitors the angular displacement of the test ventilator plate 21. The variable resistance 36 is provided with a cylindrical body 60 having a pivotable shaft 61 extending therefrom. The pivotable or rotatable shaft 61 is connected to the movable test ventilator end plate 21 along an axis which is colinear with the common axis 28 of the test ventilator plate 21. The cylindrical body of the resistor 60 is connected to a frame member 62 via a split ring clamp 64, which encompasses cylindrical body 60 of the resistor 36, and an arm 65. The arm 65 includes the U-shaped clamp and set screw generally indicated at 66 for attaching the same to the frame member 62. Rotation of the shaft 61 varies the effective resistance value of the resistor 36. Since the body 60 of the resistor 36 is locked in a stationary relationship with respect to the movable end plate 21, and the rotatable shaft 61 is pivotable along with the movable end plate 21, the effective resistance of the resistor varies as a function of the angular displacement of the movable end plate 21, and this provides an accurate measure of the volume of gas introduced into the test ventilator expansible chamber.

Figures 6, 7:
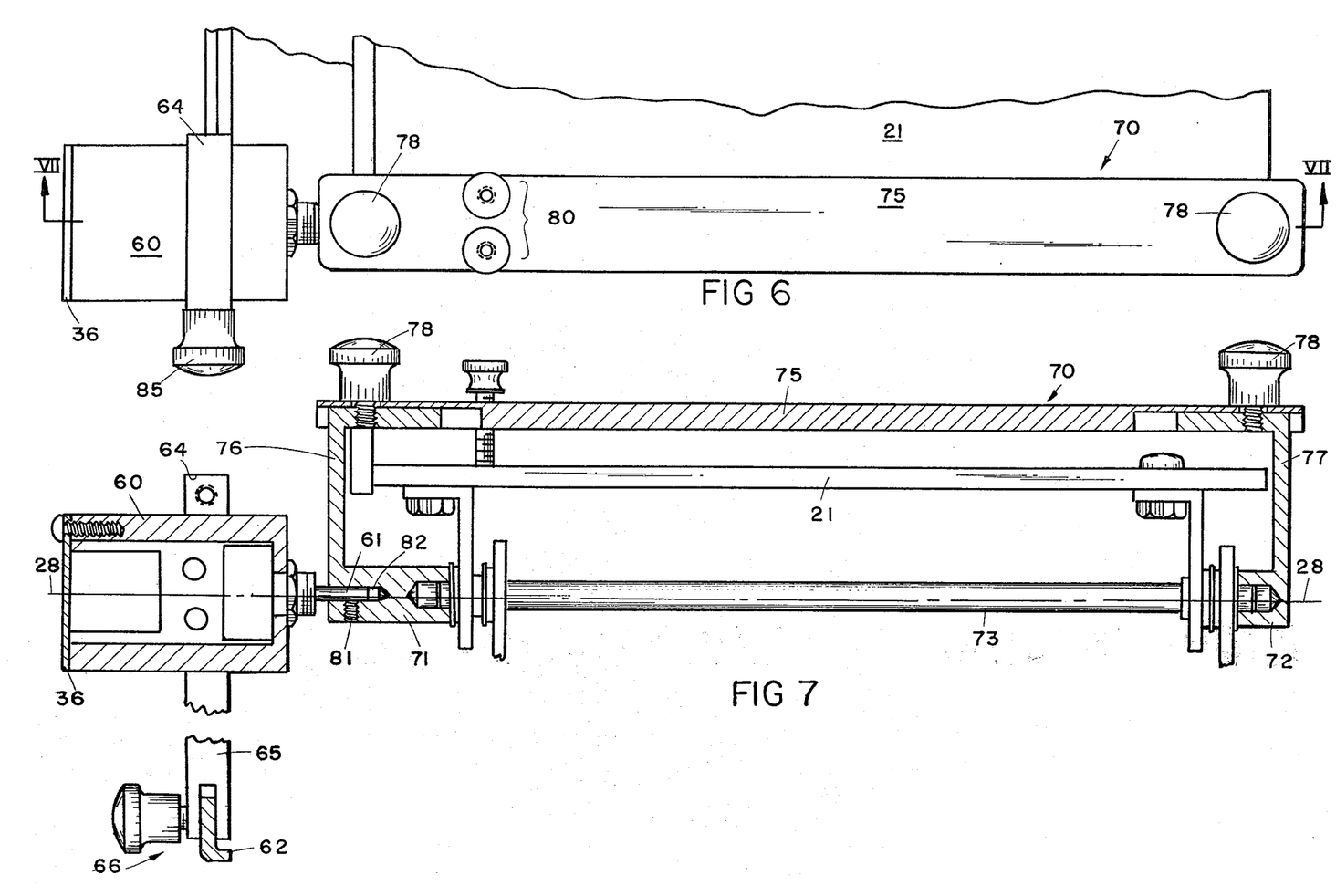
FIG. 6 is a top view of a variable resistance and clamp used as a volume transducer in the lung analog of the present invention.
FIG. 7 is a partial sectional view of the transducer and clamp illustrated in FIG. 6 taken along line VII—VII in FIG. 6.

Means are provided for coupling the pivotable shaft 61 to the test ventilator end plate 21, comprising a generally U-shaped bracket 70 which encompasses the test ventilator end plate 21. The bracket 70 includes first and second sockets 71 and 72 which encompass opposing ends of a pivot shaft 73 about which the movable test ventilator plate 21 is journaled. The U-shaped bracket 70 is preferably of a three-piece construction comprising a tieing strap 75 and end brackets 76 and 77. The end brackets 76 and 77 contain sockets 71 and 72, respectively. The end brackets 76 and 77 are detachable or moveable with respect to tieing strap 75 to permit mounting of the sockets 71 and 72 over the ends of the pivot shaft 73. In the assembly of the U-shaped bracket 70, the end brackets 76 and 77 are disposed on opposing sides of the movable test ventilator plate 21 with the sockets 71 and 72 encompassing the ends of the pivot shaft 73. Thereafter, the tieing strap 75 is connected thereto with a first pair of thumb actuated set screws at 78. A second pair of thumb actuated set screws are provided at 80 for engaging the test ventilator plate 21 and removing any lost motion between the generally U-shaped bracket 70 and the test ventilator plate 21. The end bracket 76 also includes a socket 82 for receiving the rotatable shaft 61 of the resistor 36 in a relationship colinear with the common axis 28 of the pivot shaft 73. A set screw at 81 rigidly connects the rotatable shaft 61 for concurrent pivotal movement along with the U-shaped bracket 75 and the test ventilator plate 21.

A split ring connector 64 is used to connect the cylindrical body 60 of the resistor 36 to stationary arm 65 to permit zeroing of the resistor after assembly. The clamping tension of the split ring clamp 64 is varied with thumb actuated screw 85. After the generally U-shaped bracket 70 is mounted to the test ventilator plate 21, and the rotatable shaft 61 of the resistor 36 is fixed in socket 82 in bracket 76, the arm 65 is mounted on stationary frame member 62 with the clamp and set screw disposed on the end of the arm 65 at 66. Thereafter, the thumb screw 85 of split ring clamp 64 is set at a loose setting and the body of the resistor 36 is positioned axially and rotated relative to the split ring clamp 64 to zero the output of the resistor 36. This zeroing operation is carried out with the test ventilator plate 21 on the stops upon which it rests when the test ventilator chamber is deflated.

With reference now again to FIGS. 1, 2 and 3, the training test lung is normally provided with tension springs at 48 and 49 which are associated with the chambers 12 and 13; and the plates 21 and 22, respectively. Means are provided for anchoring the ends of the springs 48 and 49 at various locations radially from the common axis 28 of the movable plates. In the operation of the training test lung, this allows the tension provided by the springs 48 and 49 to be individually varied to simulate human lungs of varying compliance. The means for varying the radial position of the springs 48 and 49 comprises sets of rails at 90 and 91 which are mounted in any suitable fashion to the movable end plates 21 and 22 and the frame 11, respectively. The tension springs 48 and 49 are anchored on clamps 93 and 94 which slidably engage the rails 90 and 91, respectively, but which may be secured thereto in any radial position with thumb screws 95. In the operation of the pneumatic lung analog of the present invention, the tension spring 48, which is associated with the spontaneous breath expansible chamber 13, is set at zero radial distance relative to the common axis 28. This position comprises an infinite compliance setting (zero elastance). The compliance of the lungs simulated by the test ventilator chamber 12 is then set by the placement of the tension spring 48 with slidable clamps 93 and 94. Indicia disposed at 100 on the edge of the movable test ventilator plate 21 indicates the appropriate compliance setting.

With specific reference now to FIG. 2, it is illustrated that the pneumatic lung analog of the present invention further includes an adjustable stop at 105 which is anchored to the frame 11. The adjustable stop 105 defines the exact position of the movable end plates relative to the frame 11 when the expansible chambers are deflated. The adjustable stop 105 normally comprises a barrier precisely positioned relative to the frame 11 and may, for example, comprise a shaft received in the frame 11. Interference between the highest portion of the stop 105 and the movable end plate defines the resting position of the movable end plate when the expansible chambers are deflated. Preferably, the adjustable stop 105 defines a resting place for the movable end plates that orients them in a generally parallel relationship with the horizontally extending frame 11. A second stop 107 is anchored on the frame 11 and the movable end plates for limiting the movement of the movable end plates away from the frame 11 when the expansible chambers are inflated. Preferably, the stop 107 comprises a flexible member of a preselected length, one end of which is anchored to the frame 11 and the other end of which is anchored to one or the other of the movable end plates. Or the stop may comprise a barrier attached to curvilinear plate 170. In preferred embodiments, adjustable stops 105 and stops 107 are provided for both the test ventilator and spontaneous breath end plates.

In preferred embodiments of the invention, the frame 11 is provided with a stationary end plate which defines a planar surface 110, best illustrated in FIGS. 2 and 3. The expansible chambers 2 and 13 preferably comprise a pair of pleated bellows which are generally cylindrical in shape and which include a plurality of tension rings which prevent expansion in the lateral direction. The bellows 12 and 13 are disposed between the stationary end plate defining the surface 110 and the movable end plates 21 and 22, respectively. When the bellows are inflated they expand in an accordian-like fashion to drive the end plates upwardly. Preferably, the bellows are disposed in a generally vertical orientation such that when the bellows are inflated the movable end plates are driven upwardly. Gravity compensating means is provided for neutralizing the effect of the weight of the movable end plates acting against the expansible chambers 12 and 13. The gravity compensating means is best illustrated in FIGS. 2 and 3. Arms 112 extend from the bottom of movable end plates 21 and 22. Brackets 113 are secured to the frame 11. Tension springs 114 extend between the arms 112 and the brackets 113 for providing a moment centered about the common axis 28 of the movable end plates which counteracts the gravitational force which would normally be applied to the bellows 12 and 13 by the weight of the movable end plates. One end of the springs 114 is adjustably secured to the brackets 113 by a rod 115 which is provided with a hook for engaging the spring 114 and a threaded end for insertion in an aperture in the brackets 113. A thumb actuated nut engages the threads on the ends of the rod 115 extending through apertures in the bracket 113 for varying the tension of the spring 114 by varying the position of the rod 115 relative to the brackets 113. Alternately, the spring may be attached to frame 11 by means of a bracket positionally adjustable thereto by means of screws protrduing through an extended slot.

The pleated sections of the bellows 12 and 13 are prevented from bulging in the lateral direction by a series of tension bands comprising very thin sheet metal rings which are located snugly about each pleat. Proper location of the center section of the bellows is ensured by a guide bracket 160 which comprises a sheet metal plate having an aperture therein equal to the minor diameter of the pleats of the bellows 12 and 13. The bellows 12 and 13 extend through the aperture in one end of the plate 160, and the opposite end of the plate 160 is pivoted about an axis 161 disposed in a bracket 162 that is secured to the frame 11. The sheet metal bracket 160 is thus permitted to pivot along with the bellows 12 and 13 when they are inflated, but it restrains the bellows from movement in a radial direction and thus prevents the bellows from displacing when they are inflated.

A curvilinear plate 170 is disposed approximate the free ends of the movable end plates and generally perpendicular thereto. The plate 170 is attached to the stationary frame 11 in any suitable fashion. The panel is positioned adjacent the free ends of the movable end plates and is provided with printed indicia for indicating the inserted volume in the expansible chambers at various simulated compliances.

The above description is considered to be exemplary and that of the preferred embodiment only. Other modifications will occur to those skilled in the art. The true scope and spirit of the present invention is to be determined by reference to the appended claims.

The embodiments of the invention in which an exclusive property or privilege is claimed are defined as follows:

1. A pneumatic lung analog for testing a ventilator comprising:
   a frame;
   a test ventilator expansible chamber disposed on said frame for receiving the output of a test ventilator;
   a movable wall disposed on said test expansible chamber;
   means for applying a force to said movable wall in a direction that expands said test expansible chamber and thus simulates human lungs in spontaneous breathing; and
   means for providing a measure of the pressure and volume of air supplied to said test expansible chamber by a ventilator when said means for pulling is actuated, whereby the function of the ventilator is quantitatively determined.

2. The pneumatic lung analog of claim 1 wherein:
   said means for applying a force comprises a spontaneous breath generator expansible chamber disposed on said frame for receiving the output of a spontaneous breath generator; and
   said movable wall comprises:
   a movable test end plate disposed on said test expansible chamber;
   a movable spontaneous breath end plate disposed on said spontaneous breath expansible chamber; and
   means for interconnecting the same to provide for the concurrent motion thereof.

3. The pneumatic lung analog of claim 2 wherein said means for interconnecting comprises a hinged joint extending therebetween.

4. The pneumatic lung analog of claim 2 wherein said movable test end plate and said movable spontaneous breath end plate are pivotally mounted on said frame about a common axis.

5. The pneumatic lung analog of claim 4 wherein said means for providing a measure of the pressure and volume of air applied to said test expansible chamber comprises a pressure transducer for continuously monitoring positive airway pressure and means for determining the displacement of said movable test end plate and said means for providing a measure of the displacement of said test plate comprising a variable resistor having a body and a rotatable shaft for varying the resistance value of said variable resistor; means for securing said body to said frame; and means for coupling said shaft to said test end plate for concurrent angular movement therewith.

6. The pneumatic lung analog of claim 5 wherein said means for coupling said shaft to said test end plate comprises a generally U-shaped bracket encompassing said test end plate; first and second sockets disposed on opposing ends of said U-shaped bracket for encompassing opposing ends of a pivot shaft for said test end plate; and a third socket for receiving said rotatable shaft of said variable resistance, said rotatable shaft being received in a colinear relationship with said pivot shaft of said test end plate.

7. The pneumatic lung analog of claim 5 wherein said means for securing said body to said frame comprises a split ring clamp for encompassing said body, said clamp including means for varying the tension of said clamp to provide for rotation of said body relative to said clamp and zeroing of said variable resistance.

8. The pneumatic lung analog of claim 7 wherein said means for securing said body to said frame comprises an arm for interconnecting said clamp to said frame and means for securing said arm to said frame.

9. The pneumatic lung analog of claim 4 wherein said frame is provided with a stationary end plate and said test expansible chamber and said spontaneous breath expansible chamber are disposed between said stationary plate and said movable test end plate and said spontaneous breath movable end plate, respectively, said movable end plates being parallel to said stationary end plate when said expansible chambers are deflated.

10. The pneumatic lung analog of claim 9 wherein said lung analog is further characterized by an adjustable stop anchored to said frame and limiting the movement of said movable test end plate toward said stationary plate to assure the exact position of said movable end plate relative said frame when said bellows are deflated.

11. The pneumatic lung analog of claim 10 wherein said adjustable stop is a shaft threadably anchored to said frame and extends toward said movable test end plate, said shaft having a free end abutting said movable test end plate when said test expansible chamber is deflated.

12. The pneumatic lung analog of claim 4 wherein said lung analog comprises means for biasing said test end plate for pivotal motion toward said frame, said biasing means simulating the respiratory compliance of a patient's lungs.

13. The pneumatic lung analog of claim 12 wherein said means for biasing comprises a tension spring connected at one end to said movable test end plate and at the other end to said frame.

14. The pneumatic lung analog of claim 13 wherein said lung analog comprises adjustment means for adjusting the force of said tension spring acting on said movable test end plate, said adjustment means comprising attachment means for anchoring the ends of said spring at various locations radially from the common axis of said movable test end plate, whereby the tension provided by said spring can be varied for a given angular movement of said movable test end plate to simulate human lungs of varying compliance.

15. The pneumatic lung analog of claim 14 wherein said attachment means includes a pair of spaced guide rails, one of said guide rails being anchored on said movable test end plate and extending radially from the axis of pivot of said movable test end plate, the other of said guide rails being anchored to said frame and aligned with said one guide rail, and clamp means movable along said guide rails for receiving the ends of said spring, said clamp means positioning said spring radially with respect to the common axis of said movable test end plate.

16. The pneumatic lung analog of claim 15 wherein said adjustment means includes a calibrated scale along one of said guide rails to provide a visual readout of the position of said spring relative the common axis of said movable test end plate.

17. The pneumatic lung analog of claim 4 wherein said test expansible chamber and said spontaneous breath expansible chamber each comprise an expansible bellows, said bellows having means for limiting the radial expansion of said bellows, whereby said bellows are capable of expansion and contraction in an axial direction in an accordian-like manner.

18. The pneumatic lung analog of claim 2 wherein said means for interconnecting comprises a lift bar.

19. The pneumatic lung analog of claim 2 wherein said spontaneous breath generator comprises a volume ventilator.

20. The pneumatic lung analog of claim 2 wherein said analog is further characterized by a stop anchored to said frame and limiting the movement of said movable end plate away from said frame when said expansible chambers are inflated.

21. The pneumatic lung analog of claim 20 wherein said stop is a flexible member having a preselected length, one end of said flexible member being anchored to said frame, the other end of said flexible member being anchored to said movable end plate to limit the movement of said movable end plate away from said frame.

22. The pneumatic lung analog of claim 2 wherein said expansible chambers are constrained to expand along vertical axes and said movable end plate extends horizontally, said movable end plate extending parallel to and spaced above said frame when said expansible chambers are deflated; and gravity compensating means cooperatively associated with said movable end plate to neutralize the effect of its weight as a force acting against said expansible chambers when said expansible chambers are deflated.

23. The pneumatic lung analog of claim 22 wherein said gravity compensating means is comprised of a spring anchored at one end to said movable end plate and at the other end to said frame, said spring when tensioned exerting a force on said movable end plate urging it away from said frame.

24. The pneumatic lung analog of claim 23 wherein said movable end plate includes a bracket extending vertically downwardly, said one end of said spring being attached to said bracket at a point spaced below said movable end plate, said spring extending horizontally beneath said movable end plate so that when said spring is tensioned, the force of said spring acts on said movable end plate through said spacing to create a moment urging said movable end plate to pivot away from said frame.

25. The pneumatic lung analog of claim 24 wherein the other end of said spring is adjustably anchored to said frame to permit selection of the degree of tension on said spring by movement thereof relative said one end.

26. The pneumatic lung analog of claim 2 further including indicating means comprising a panel having printed indicia thereon, said panel being positioned adjacent the free end of said movable plate and generally perpendicular thereto when said expansible chambers are deflated, said printed indicia having a locus of visual readouts indicating the simulated compliance and volume of said expansible chambers.

27. The pneumatic lung analog of claim 26 wherein said panel is curved to match the arcuate path of said free end of said movable plate to permit a direct readout of the position of said movable plate.

28. The pneumatic lung analog of claim 2 wherein each of said test expansible chamber and said spontaneous breath expansible chamber are provided with air inlets and at least one of said air inlets is provided with means for defining a preselected flow resistance for simulating the flow resistance of the respiratory tract of a patient.

29. The pneumatic lung analog of claim 2 wherein the outputs of said means for providing a measure of the pressure and volume of air applied to said test expansible chamber are inputted to one of the devices in the group consisting of a dedicated computer and an X-Y recorder.

30. The pneumatic lung analog of claim 1 wherein said means for providing a measure of the pressure and volume of air applied to said test expansible chamber comprises a pressure transducer for continuously monitoring positive airway pressure and means for determining the displacement of said movable wall.

31. The pneumatic lung analog of claim 30 wherein said movable wall is pivotally mounted on said frame.

32. The pneumatic lung analog of claim 31 wherein said means for determining the displacement of said movable wall comprises means for providing a measure of the angular displacement of said movable wall.

33. Apparatus for modifying a pneumatic lung analog of the type having a frame, first and second expansible chambers disposed on said frame for simulating human lungs and first and second movable end plates mounted on said chambers, said apparatus modifying said lung analog to provide a device capable of testing a ventilator of the type used with spontaneously breathing patients, said apparatus comprising:

means for interconnecting said first and second movable end plates to provide for the concurrent movement thereof when the output of a spontaneous breath generator is connected to one of said chambers to provide a spontaneous breath chamber and said ventilator is connected to the other of said chambers to provide a test chamber;

means for providing a measure of the pressure and volume of air applied to said test chamber by said ventilator, whereby the added work of breathing through the said ventilator is determined.

34. The apparatus of claim 33 wherein said means for interconnecting comprises a hinged joint extending between said first and second movable end plates.

35. The kit of claim 33 wherein said means for interconnecting comprises a lift bar.

36. The apparatus of claim 33 wherein said means for providing a measure of the pressure and volume of air applied to said test chamber comprises a pressure transducer for continuously monitoring positive airway pressure and means for determining the displacement of said movable plates.

37. The apparatus of claim 36 wherein said first and second end plates are pivotally mounted on said frame about a common axis and said means for determining the displacement of said movable plates comprises means for providing a measure of the angular displacement of said movable plates.

38. The apparatus of claim 37 wherein said means for providing a measure of the angular displacement of said movable plates comprises a variable resistor having a body and a rotatable shaft for varying the resistance value of said variable resistor; means for securing said body to said frame; and means for coupling said shaft to said movable plates for concurrent angular movement therewith.

39. The apparatus of claim 38 wherein said means for coupling said shaft to said movable plates comprises a generally U-shaped bracket encompassing one of said movable plates; first and second sockets disposed on opposing ends of said U-shaped bracket for encompassing opposing ends of a pivot shaft for said movable plate; and a third socket for receiving said rotatable shaft of said variable resistance, said rotatable shaft being received in a colinear relationship with said pivot shaft of said movable plate.

40. The apparatus of claim 39 wherein said means for securing said body to said frame comprises a split ring clamp for encompassing said body, said clamp including means for varying the tension of said clamp to provide for rotation of said body relative to said clamp and zeroing of said variable resistance.

41. The apparatus of claim 40 wherein said means for securing said body to said frame comprises an arm for interconnecting said clamp to said frame and means for securing said arm to said frame.

42. The apparatus of claim 33 wherein each of said test chamber and said spontaneous breath chamber are provided with air inlets and at least one of said air inlets is provided with means for defining a preselected flow resistance for simulating the flow resistance of the respiratory tract of a patient.

43. The apparatus of claim 33 wherein the outputs of said means for providing a measure of the pressure and volume of air applied to said test chamber are inputted to one of the group of devices consisting of a dedicated computer and an X-Y recorder.

44. The apparatus of claim 33 wherein said spontaneous breath generator comprises a volume ventilator.

* * * * *